United States Patent Office 3,069,231
Patented Dec. 18, 1962

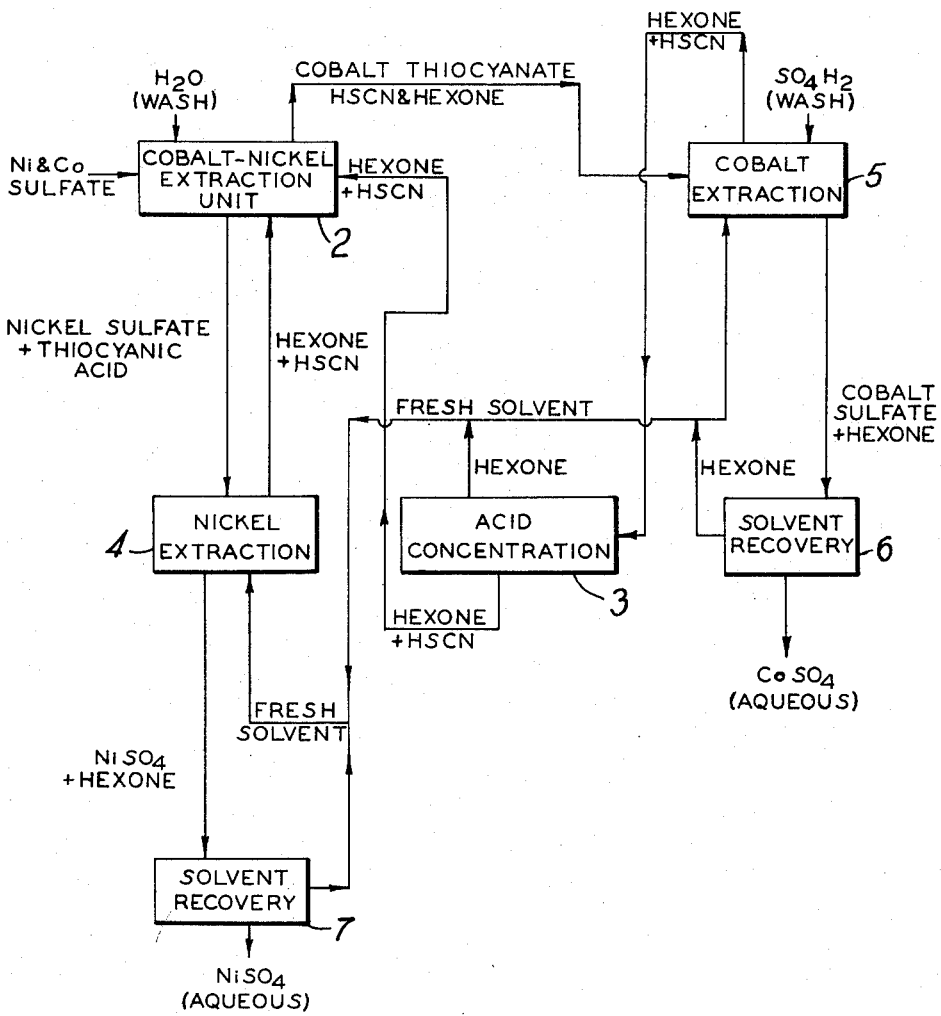

3,069,231
METHOD OF SEPARATING NICKEL AND COBALT COMPOUNDS AND PRODUCING SALTS THEREFROM
Robert A. Hard, Lewiston, and Herman F. Kummerle, Tonawanda, N.Y., assignors to Union Carbide Corporation, a corporation of New York
Filed Dec. 29, 1960, Ser. No. 79,208
6 Claims. (Cl. 23—117)

This invention relates to a process for the separation of nickel and cobalt from compounds containing these metals.

It is well known that nickel and cobalt often are found together in nature and that the production of high purity cobalt, for instance, is complicated by the difficulty involved in separating the nickel impurity content from the cobalt. This difficulty is due to the community of similar chemical and physical properties of the two metals whereby they form similar compounds with many reagents.

It is also known, however, that the thiocyanate compounds of these metals do possess dissimilar chemical properties in that the cobalt thiocyanate complexes are more soluble in the organic phase than the nickel thiocyanate complexes. By providing an aqueous solution of nickel and cobalt thiocyanates, the cobalt thiocyanate can be separated from the nickel by treatment with a water-immiscible organic solvent leaving the nickel thiocyanate in aqueous solution.

In one commercial application of this process an aqueous solution of nickel and cobalt sulfates or carbonates is prepared from the ores and treated with calcium thiocyanate forming the mixed nickel and cobalt thiocyanates and precipitating calcium sulfate or calcium carbonate, depending on whether the sulfates or carbonates were treated. The cobalt thiocyanate complex is separated from the nickel thiocyanate by treating with a water-immiscible organic solvent for the cobalt. The nickel and cobalt are then recovered from their respective solutions by treating each solution with a lime slurry to precipitate the hydroxides of the metals. The hydroxides are removed by filtration or centrifuging and the calcium thiocyanate solution is recovered for recycling. Cobalt and nickel metal are then extracted from the hydroxides.

The above-described process is a solid-liquid extraction process and requires several cumbersome filtration steps to remove solid reagents from the liquids. The necessary filtration operations must be followed by washing, thereby entailing dilution of the filtrate. Evaporation of the thus diluted filtrate may cause decomposition of the components thereof. A more desirable process would be a liquid-liquid extraction process wherein the reagents are fully recoverable.

It is the primary object of this invention, therefore, to provide a liquid-liquid extraction separation process for the separation of nickel and cobalt thereby avoiding cumbersome filtration, washing and evaporation steps.

It is also an object of this invention to provide a liquid-liquid extraction process for the separation of nickel and cobalt wherein the required reagents are easily recovered and recycled.

Other aims and advantages of the invention will be apparent from the following description and the appended claims.

The drawing shows a schematic flow chart of the process of this invention.

In accordance with these objects a process is provided comprising preparing an aqueous solution containing nickel and cobalt salts, contacting said solution with an excess of thiocyanic acid in a water-immiscible organic solvent for the formed complex cobalt thiocyanates, extracting the immiscible organic solution of complex cobalt thiocyanates leaving an aqueous solution of cobalt-free nickel sulfate and nickel thiocyanates in equilibrium with thiocyanic acid, reacting the extracted cobalt thiocyanates with dilute sulfuric acid to form aqueous nickel-free cobalt sulfate and an organic solution of thiocyanic acid, separating the nickel and cobalt sulfate from the respective solutions and recycling the thiocyanic acid. The most commonly used solvent has been methyl isobutyl ketone (hexone).

Other mixed salts of nickel and cobalt such as the chlorides and nitrates may be used as the starting material. A particularly advantageous operation consists in using a sulfuric acid leach to recover nickel and cobalt from the ores and using a solution of nickel and cobalt sulfates as the starting material. The nickel and cobalt sulfate solution is contacted with an excess of thiocyanic acid dissolved in hexone. The thiocyanic acid and hexone solution includes the thiocyanic acid and solvent recovered in the subsequent steps of the process. By this reaction cobalt thiocyanates are formed and taken up into the immiscible organic solution of hexone while the nickel sulfates remain in aqueous solution with some nickel thiocyanates, also formed in the reaction. In this reaction an excess of thiocyanic acid in hexone is used to form the complex cobalt thiocyanates. Four to seven mols of thiocyanic acid per mol of cobalt are generally sufficient to give a complete separation of the cobalt from the nickel compounds. This thiocyanic acid and hexone solution is made up of recycled thiocyanic acid and recycled solvent recovered from the final extraction steps.

The maximum concentration of thiocyanic acid in the solvent is determined by the solubility of the acid in the particular solvent used. The minimum concentration is a function of the reaction equilibrium conditions and is also limited by the size of the equipment. The preferred range of concentrations of thiocyanic acid in hexone is from 1 normal to 1.5 normal solutions. The concentration most commonly used is 1.3 normal.

Hexone is the preferred water-immiscible organic solvent. Other water-immiscible organic solvents that show solubility for the complex cobalt thiocyanates formed by the reaction of the thiocyanic acid on the cobalt sulfate solution may be used. Among these are alcohols, ketones and some ethers, such as amyl ether.

The immiscible organic solution containing the complex cobalt thiocyanates and thiocyanic acid in hexone is then treated with a dilute sulfuric acid solution whereby the cobalt is displaced from the thiocyanic complex and scrubbed from the organic solvent, the thiocyanate remaining in the organic phase as thiocyanic acid. The resulting cobalt sulfate contains some solvent and is fed to a solvent recovery unit where the solvent is recovered for recycling and an aqueous solution of nickel-free cobalt sulfate is recovered. The cobalt sulfate is free of thiocyanic acid and is slightly acidic.

The exact concentration of the dilute sulfuric acid used in this extraction step depends on the number of stripping stages used—the weaker the acid, the more stages are required. Acid concentrations as low as 0.5 M may be used if a number of extraction stages are practical. The maximum concentration of acid is determined by the decomposition tendency of the solvent and the thiocyanic acid. It has been a disadvantage of same prior art processes that thiocyanic compounds decomposed contaminating the nickel and cobalt solutions with sulfur. It is believed that sulfuric acid concentrations up to 5 M can be safely used. A concentration of about 2 M is preferred. Hydrochloric acid may be used in this extraction step if the chloride salt of cobalt is desired.

The organic solution of thiocyanic acid recovered from the reaction with dilute sulfuric acid is then concentrated for use in treating incoming nickel and cobalt sulfate solutions. This acid solution is concentrated by removing excess solvent. The fresh solvent recovered in the concentration step is used to scrub the raffinate of the nickel-cobalt separation. This raffinate contains nickel sulfate and thiocyanates in equilibrium with thiocyanic acid. The raffinate may also contain some retained cobalt values. Undesirable cobalt values can be further removed from the raffinate by additional extraction steps and the residual thiocyanic acid is removed by washing with solvent. The solvent is then recovered from the nickel sulfate solution in a solvent recovery unit and used again to scrub more nickel sulfate of thiocyanic acid. The aqueous solution of nickel sulfate leaving the solvent recovery unit is cobalt free and thiocyanic acid free.

With reference to the drawing, a solution of nickel and cobalt sulfates is fed into the liquid-liquid extraction unit 2 where it is contacted with thiocyanic acid in hexone. The thiocyanic acid-hexone solution is made up of recycled product from the acid concentration unit 3 and the liquid-liquid extraction unit 4 where the raffinate from unit 2 containing nickel sulfate and excess thiocyanic acid is scrubbed of the excess acid by fresh solvent. It is to be understood that any of the liquid-liquid extraction steps called for in this process can be carried out either co-currently or counter-currently.

The complex cobalt thiocyanates, formed by the reaction of the thiocyanic acid in hexone on the cobalt sulfate solution in the liquid-liquid extraction unit 2, are taken up into the immiscible organic solvent with some excess acid, separated from the aqueous nickel sulfate raffinate and backwashed with water to remove traces of nickel sulfate and them pumped to the liquid-liquid extration unit 5 where the cobalt is displaced from the thiocyanate complex as aqueous cobalt sulfate and scrubbed from the organic solvent by the dilute sulfuric acid. The thiocyanic acid is retained in the organic solution by the addition of solvent from the solvent recovery unit 6 and from the thiocyanic acid concentration unit 3. The diluted organic solution of thiocyanic acid is fed into the acid concentration unit 3. The cobalt sulfate solution which contains some residual solvent is fed into the solvent recovery unit 6 where the solvent is recovered for use in scrubbing the nickel sulfate raffinate of acid and also in the cobalt extraction unit 5 where the solvent carries away the thiocyanic acid. The cobalt sulfate emitted from the solvent recovery unit 6 is nickel free and thiocyanic acid free although it does have a slight acidity.

The acid concentration unit 3 takes thiocyanic acid dissolved in an excess of solvent from the cobalt extraction unit 5 and removes sufficient solvent to bring the acid-solvent solution to a concentration suitable for contacting the incoming nickel-cobalt sulfate solution. The solvent recovered from this operation is recycled for scrubbing the nickel and cobalt sulfates of any thiocyanic acid.

The nickel sulfate raffinate from the liquid-liquid extraction unit 2 containing the excess thiocyanic acid is scrubbed of this acid in the nickel extraction unit 4 by the recycled solvent from the acid concentration unit 3 and the two solvent recovery units 6 and 7. It is in the solvent recovery unit 7 that the nickel sulfate from the liquid extraction unit 4 is stripped of any excess solvent. The aqueous nickel sulfate emitted from this unit is cobalt-free.

As an example of the practice of this invention an aqueous solution of nickel and cobalt sulfates was prepared. This solution contained 52 grams of sulfates per liter of solution and the molar ratio of nickel to cobalt contents was about 2.2 to 1. It is to be noted that ratios of nickel to cobalt as high as 30 to 1 have been successfully used and that solutions of mixed sulfates having even higher concentrations of nickel may be used. Likewise high cobalt to nickel ratios can be used if this is technically and economically necessary. This solution was counter-currently contacted with thiocyanic acid dissolved in hexone with a concentration of 39.5 grams of acid per liter of solvent. The extract of this operation consisted of cobalt thiocyanate complex in hexone. This extract was washed with small amounts of water to remove any traces of nickel carried in the cobalt solution.

The raffinate contained 11.8 grams per liter of nickel ion. This raffinate was washed with fresh solvent to recover the residual thiocyanic acid contained therein and the solvent removed from the nickel sulfate by evaporation.

The cobalt containing extract of the first operation was treated with 2 molar sulfuric acid in a volumetric ratio of 1 volume of acid solution for 2 volumes of the cobalt extract. At the same time an equal volume of hexone was used for removal of the thiocyanic acid displaced from the cobalt thiocyanate complex extract by the dilute sulfuric acid. This solution of thiocyanic acid in hexone was suitable for concentration and recycling. The solvent contained in the cobalt sulfate solution was removed by evaporation leaving a nickel-free and thiocyanate-free cobalt sulfate solution.

In another example an aqueous solution of nickel sulfate and cobalt sulfate was prepared containing 51.3 grams per liter of nickel and 27.8 grams per liter of cobalt. This solution was co-currently contacted with a hexone solution of thiocyanic acid containing 85 grams of thiocyanic acid per liter of hexone. The organic to aqueous volume ratio was 2:1. The extract of this operation consisted of cobalt thiocyanic complex in hexone.

The raffinate was subject to 14 additional extraction steps, four of which were carried out with thiocyanic acid dissolved in hexone and the remaining 10 were carried out with hexone. After the fourth stage of extraction, the raffinate contained a nickel to cobalt ratio of approximately 4.4:1. After 10 stages of extraction, the ratio of nickel to cobalt in the raffinate was approximately 20:1. The analysis of the final raffinate showed a ratio of nickel to cobalt greater than 5500:1, i.e., a nickel salt practically free of cobalt was obtained.

These nickel and cobalt solutions can be reduced to the respective metals by any of the classical processes such as hydrogen reduction, electrolysis, precipitation to oxide followed by reduction, etc. These solutions, having a desirable acidity, can also be used for plating.

What is claimed is:

1. A process for the separation of nickel and cobalt from mixed similar compounds thereof comprising preparing an aqueous solution of nickel and cobalt salts, reacting the solution with thiocyanic acid dissolved in a water-immiscible organic solvent for the thus formed cobalt thiocyanate compounds, extracting the cobalt thiocyanate compounds in the organic solution from said aqueous solution, reacting the extracted organic solution of cobalt thiocyanate compounds with dilute sulfuric acid to form cobalt sulfate and thiocyanic acid, separating the cobalt sulfate as an aqueous solution from the thiocyanic acid and solvent, and recycling the thiocyanic acid and solvent for treatment of additional aqueous nickel and cobalt salts solution.

2. A process for the separation of nickel and cobalt from ores thereof comprising leaching said ores with sulfuric acid to obtain an aqueous solution of nickel and cobalt sulfates, reacting said aqueous solution with thiocyanic acid carried in an organic solvent to form cobalt thiocyanate compounds in a solution of nickel sulfate and thiocyanates in equilibrium with thiocyanic acid, the solvent being a water-immiscible organic solvent for the thus formed cobalt thiocyanate compounds, separating the organic phase containing cobalt thiocyanate compounds and residual thiocyanic acid from the aqueous solution, reacting the extracted organic solution of cobalt thiocyanate compounds with dilute sulfuric acid to form aqueous cobalt sulfate and thiocyanic acid, separating the cobalt sulfate and nickel sulfate from the thiocyanic acid and solvent contained in their respective solutions to provide aqueous solutions of cobalt-free nickel sulfate and nickel-free cobalt sulfate, and recycling the recovered thiocyanic acid and solvent for treatment of additional aqueous nickel and cobalt sulfates solution.

3. A process for the separation of nickel and cobalt from mixed similar compounds thereof comprising preparing an aqueous solution of nickel and cobalt sulfates, reacting said solution with thiocyanic acid to form cobalt thiocyanate compounds leaving nickel sulfate and thiocyanates in equilibrium with thiocyanic acid, the thiocyanic acid being carried in a water-immiscible organic solvent for the thus formed cobalt thiocyanate compounds, separating the organic solution containing cobalt thiocyanate compounds from the aqueous phase, reacting the organic solution of cobalt thiocyanate compounds with dilute sulfuric acid to form cobalt sulfate and thiocyanic acid.

4. The process in accordance with claim 3 wherein the aqueous solution of nickel sulfate and thiocyanates in equilibrium with thiocyanic acid and the organic solution of cobalt sulfate and thiocyanic acid are each backwashed with additional solvent to remove the thiocyanic acid, and thereupon removing the solvent from each solution to provide separate aqueous solutions of cobalt-free nickel sulfate and nickel-free cobalt sulfate, and recycling the thiocyanic acid in solvent for treatment of additional aqueous nickel and cobalt sulfates solution.

5. The process in accordance with claim 4 wherein the thiocyanic acid recovered by backwashing the organic and aqueous solutions with solvent is concentrated in said solvent by removing excess solvent, and the concentrated solution of thiocyanic acid in solvent is recycled for reaction with aqueous nickel and cobalt sulfate solution, and the excess solvent is recovered and recycled for use in backwashing thiocyanic acid-containing organic and aqueous solutions.

6. A process for separating nickel and cobalt from mixed similar compounds thereof comprising preparing an aqueous solution of nickel and cobalt sulfates, counter-currently contacting said aqueous solution with an excess of thiocyanic acid in methyl isobutyl ketone to form cobalt thiocyanate compounds in said organic solution leaving substantially aqueous nickel sulfate and thiocyanates in equilibrium with thiocyanic acid, separating the organic solution while simultaneously backwashing with water to remove contained traces of nickel sulfate from said organic solution, counter-currently contacting said organic solution with dilute sulfuric acid to form aqueous cobalt sulfate, backwashing the cobalt sulfate solution and nickel sulfate solution with additional methyl isobutyl ketone to remove said thiocyanic acid for recycling, removing the organic solvent from the aqueous nickel sulfate and cobalt sulfate solutions to provide aqueous cobalt-free nickel sulfate and aqueous nickel-free cobalt sulfate, and recycling the recovered organic solvent for backwashing the nickel and cobalt sulfate solutions free of thiocyanic acid and for mixture with thiocyanic acid for treatment of additional aqueous nickel and cobalt sulfates solution.

References Cited in the file of this patent

UNITED STATES PATENTS 2,902,345     Hyde et al. _____ Sept. 1, 1959

OTHER REFERENCES

Williams: "Cyanogen Compounds," Edward Arnold and Co., London, 2nd Ed., 1948, pages 259 and 280.